United States Patent
Hakimi et al.

(10) Patent No.: US 11,934,476 B2
(45) Date of Patent: Mar. 19, 2024

(54) SYSTEM AND METHOD FOR CONTEXTUALIZING AND IMPROVING UNDERSTANDING OF WEB SEARCH RESULTS

(71) Applicant: TOYOTA RESEARCH INSTITUTE, INC., Los Altos, CA (US)

(72) Inventors: Shabnam Hakimi, San Francisco, CA (US); Charlene C. Wu, San Francisco, CA (US); Matthew Len Lee, Mountain View, CA (US); Nikos Arechiga, San Mateo, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 113 days.

(21) Appl. No.: 17/513,263

(22) Filed: Oct. 28, 2021

(65) Prior Publication Data
US 2023/0136179 A1    May 4, 2023

(51) Int. Cl.
*G06F 16/957*    (2019.01)
*G06F 3/0482*    (2013.01)
*G06N 5/02*    (2023.01)

(52) U.S. Cl.
CPC ........ *G06F 16/9577* (2019.01); *G06F 3/0482* (2013.01); *G06N 5/02* (2013.01); *G06F 2203/04803* (2013.01)

(58) Field of Classification Search
CPC ............... G06F 16/9577; G06F 3/0482; G06F 2203/04803; G06N 5/02
USPC ........ 707/706, 723, 726, 769, 797, 798, 805
See application file for complete search history.

(56) References Cited

U.S. PATENT DOCUMENTS

| | | | |
|---|---|---|---|
| 7,801,885 B1* | 9/2010 | Verma ................. | G06F 16/9535 707/758 |
| 8,423,538 B1* | 4/2013 | Sadikov ............ | G06F 16/90335 707/706 |
| 8,749,553 B1 | 6/2014 | Krasovsky et al. | |
| 2006/0074870 A1* | 4/2006 | Brill .................... | G06F 16/3328 707/999.005 |

(Continued)

FOREIGN PATENT DOCUMENTS

| CN | 111177342 A | 5/2020 |
|---|---|---|
| CN | 111427901 A | 7/2020 |

*Primary Examiner* — Phong H Nguyen
(74) *Attorney, Agent, or Firm* — SEYFARTH SHAW LLP (57) ABSTRACT

A method for search construct validation is described. The method includes determining a construct of a search query recognized on a search engine of a third party webpage and related constructs represented in a plurality of search results generated based on the search query. The method includes mapping the determined construct to the related constructs represented in the plurality of search results generated based on the search query. The method includes generating a knowledge graph illustrating the mapping between the determined construct and the related constructs and a hierarchy and a strength of a conceptual relationship between the determined construct and the related constructs. The method includes displaying, via an interactive user interface, an interactive graph illustrating the mapping between the determined construct and the plurality of related constructs and the hierarchy and the strength of the conceptual relationship between the determined construct and the plurality of related constructs.

18 Claims, 6 Drawing Sheets

(56) References Cited

U.S. PATENT DOCUMENTS

| | | | |
|---|---|---|---|
| 2013/0144719 A1* | 6/2013 | Yeo | G06Q 30/02 705/14.54 |
| 2013/0246383 A1* | 9/2013 | White | G06F 16/9535 707/723 |
| 2018/0068025 A1* | 3/2018 | Gadepalli | G06F 16/9535 |
| 2019/0005025 A1* | 1/2019 | Malabarba | G06F 40/295 |
| 2021/0097065 A1 | 4/2021 | Beers et al. | |
| 2022/0253491 A1* | 8/2022 | Chen | G06F 17/40 |

* cited by examiner

SYSTEM AND METHOD FOR CONTEXTUALIZING AND IMPROVING UNDERSTANDING OF WEB SEARCH RESULTS

BACKGROUND

Field

Certain aspects of the present disclosure generally relate to machine assisted cognition and, more particularly, to a system and method for contextualizing and improving of web search results.

Background

A construct is an idea or theory containing various conceptual elements, which are typically subjective and not based on empirical evidence. A search engine operates in response to constructs in a search query and generates search results including certain constructs represented in the search results. Unfortunately, established search engines make it difficult to learn a new topic or engage in cross-disciplinary collaboration because constructs are defined and referred to differently across disciplines. Further complicating this issue is that many constructs are not precisely defined, leading to confusion. This can manifest in difficulties interpreting the answers to questions and making inferences from them, especially in web searches.

This noted lack of difference and distinctions in the definition and references to constructs across disciplines can lead to suboptimal user understanding of the constructs represented in their search results. As a result, an add-on to web search engines that provides context to search results by providing a user with an estimate of the likelihood that the search results provide information about the construct of interest, is desired. In particular, a system that provides the user with data that informs their level of confidence in the answer as well as a broader understanding of the construct, is desired.

SUMMARY

A method for search construct validation is described. The method includes determining a construct of a search query recognized on a search engine of a third party webpage and related constructs represented in a plurality of search results generated based on the search query. The method includes mapping the determined construct to the related constructs represented in the plurality of search results generated based on the search query. The method includes generating a knowledge graph illustrating the mapping between the determined construct and the related constructs and a hierarchy and a strength of a conceptual relationship between the determined construct and the related constructs. The method includes displaying, via an interactive user interface, an interactive graph illustrating the mapping between the determined construct and the plurality of related constructs and the hierarchy and the strength of the conceptual relationship between the determined construct and the plurality of related constructs.

A non-transitory computer-readable medium having program code recorded thereon for search construct validation is described. The program code is executed by a processor. The non-transitory computer-readable medium includes program code to determine a construct of a search query recognized on a search engine of a third party webpage and a plurality of related constructs represented in a plurality of search results generated based on the search query. The non-transitory computer-readable medium also includes program code to map the determined construct to the plurality of related constructs represented in the plurality of search results generated based on the search query. The non-transitory computer-readable medium further includes program code to generate a knowledge graph illustrating a mapping between the determined construct and the plurality of related constructs and a hierarchy and a strength of a conceptual relationship between the determined construct and the plurality of related constructs. The non-transitory computer-readable medium also includes program code to display, via an interactive user interface, an interactive graph illustrating the mapping between the determined construct and the plurality of related constructs and the hierarchy and the strength of the conceptual relationship between the determined construct and the plurality of related constructs.

A system for search construct validation is described. The system includes a search construct detection module to determine a construct of a search query recognized on a search engine of a third party webpage and a plurality of related constructs represented in a plurality of search results generated based on the search query. The system also includes a cognitive ontology knowledge engine to map the determined construct to the plurality of related constructs represented in the plurality of search results generated based on the search query. The system further includes a knowledge graph generation engine to generate a knowledge graph illustrating a mapping between the determined construct and the plurality of related constructs and a hierarchy and a strength of a conceptual relationship between the determined construct and the plurality of related constructs. The system also includes a knowledge graph display module to display, via an interactive user interface, an interactive graph illustrating the mapping between the determined construct and the plurality of related constructs and the hierarchy and the strength of the conceptual relationship between the determined construct and the plurality of related constructs.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

A construct is an idea or theory containing various conceptual elements, which are typically subjective and not based on empirical evidence. A search engine operates in response to constructs in a search query and generates search results including certain constructs represented in the search results. Learning a new topic or engaging in cross-disciplinary collaboration often involves Internet research and analysis of various search results. Unfortunately, established search engines make it difficult to learn a new topic or engage in cross-disciplinary collaboration because constructs are defined and referred to differently across disciplines. This issue is further complicated by the lack of precise definitions for many constructs, leading to further confusion. In particular, these limitations can manifest in difficulties interpreting the answers to questions and making inferences from them, especially in web searches. For example, how does a user know that determined search results actually reflect information about the construct queried.

This noted lack of difference and distinctions in the definition and references to constructs across disciplines can lead to suboptimal user understanding of the constructs represented in Internet search results. As a result, an add-on to web search engines that provides context to search results by providing a user with an estimate of the likelihood that the search results provide information about the construct of interest, is desired. In particular, a system that provides the user with data that indicates a level of confidence in the answer provided in the search results as well as understanding of a broader confusion in comprehending the construct, is desired.

Aspects of the present disclosure are directed to a system for search construct validation that is provided as an add-on to web search engines. In some aspects of the present disclosure, a search construct validation system improves web searches by producing a knowledge graph illustrating a relationship between the construct in the search query and the constructs represented in the search results. In some aspects of the present disclosure, the knowledge graph is a cognitive ontology graph illustrating a mapping between constructs, including information about a hierarchy (e.g., 'response inhibition' is a component of 'self-control' but 'self-control' is not a component of 'response inhibition') and a strength of the relationship (e.g., 'impulsivity' is more related to 'response inhibition' than to 'self-control'). This cognitive ontology graph allows the user—regardless of level of expertise—to understand the context of the search results and incorporate that understanding into subsequent choices. In some aspects of the present disclosure, the cognitive ontology graph is presented to the user through an interactive interface for manipulating and further analyzing the cognitive ontology graph.

In some aspects of the present disclosure, the search construct validation system includes a module and a processor unit. For example, the module includes a memory component, a database, and a display unit. In this example, the memory component is configured with logic modules, which include (1) a Web search add-on; (2) a variability analyzer; (3) a cognitive ontology knowledge engine; and (4) an interactive interface for visualizing relationships between constructs. The database stores data related to each of these logic modules and the display unit may output, as a user interface, the cognitive ontology graph to assist the user in understanding the constructs represented in the web search results.

For example, the logic module performs a process that, during web searches, generates an interactive graph illustrating a relationship between a construct in a search query and constructs represented in the search results. The graph illustrates the mapping between constructs, including information about hierarchy and strength of relationship, which allows the user, regardless of level of expertise, to understand the context of the search results and incorporate that understanding into subsequent choices.

In some aspects of the present disclosure, the processor unit and logic modules produce the cognitive ontology graph illustrating the relationship between the construct in the search query and the constructs represented in the results. In these aspects of the present disclosure, the logic modules contain instructions that when executed cause the processing unit to determine a construct of a search query recognized on a search engine of a third party webpage, and determine a plurality of related constructs represented in a plurality of search results based on the search query. The determined construct is then mapped to the plurality of related constructs. Next, a hierarchy and a strength of relationship between the determined construct and the plurality of related constructs is determined. Finally, an interactive graph displays, as a user interface, at least one of the plurality of related constructs that is surfaced based on the calculated hierarchy and strength of relationship.

Figure 1:
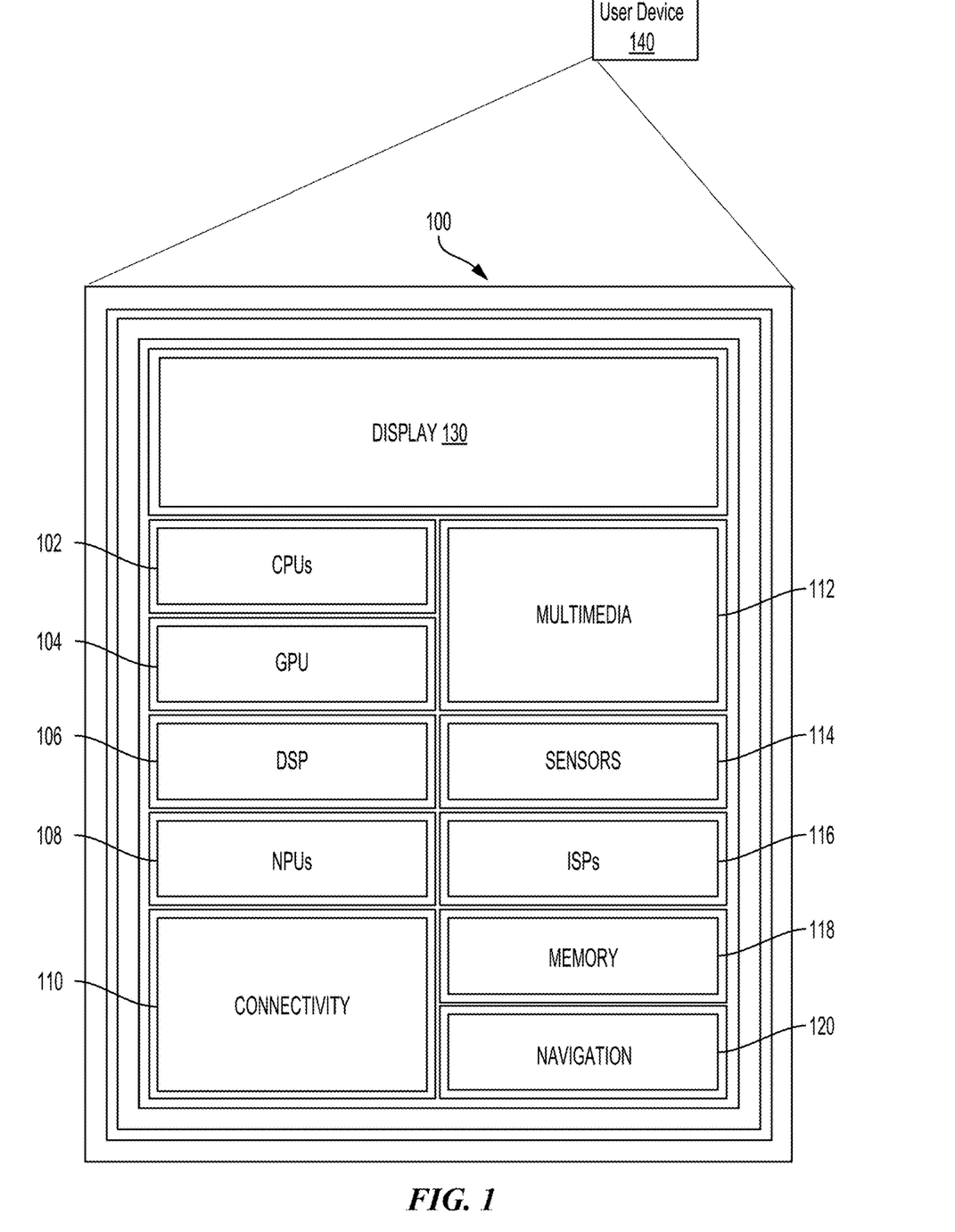
FIG. 1 illustrates an example implementation of designing a neural network using a system-on-a-chip (SOC) of a search construct validation system, in accordance with aspects of the present disclosure.

FIG. 1 illustrates an example implementation of the aforementioned system and method for a search construct validation system using a system-on-a-chip (SOC) 100, according to aspects of the present disclosure. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a control action, according to the display 130 illustrating a view of a user device.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with a user device 140. In this arrangement, the user device 140 may include a processor and other features of the SOC 100.

In this aspect of the present disclosure, instructions loaded into a processor (e.g., CPU 102) or the NPU 108 may include code to provide a context and improve an understanding of answers provided by web search results. The instructions loaded into a processor (e.g., CPU 102) may also include code to determine a construct of a search query recognized on a search engine of a third party webpage and a plurality of related constructs represented in a plurality of search results generated based on the search query. The instructions loaded into the processor (e.g., CPU 102) may also include code to map the determined construct to the plurality of related constructs represented in the plurality of search results generated based on the search query.

The instructions loaded into the processor (e.g., CPU 102) may also include code to generate a knowledge graph illustrating the mapping between the determined construct and the plurality of related constructs and a hierarchy and a strength of a relationship between the determined construct and the plurality of related constructs. The instructions loaded into the processor (e.g., CPU 102) may also include code to display, via an interactive user interface, the knowledge graph illustrating the mapping between the determined construct and the plurality of related constructs and the hierarchy and the strength of the relationship between the determined construct and the plurality of related constructs.

Figure 2:
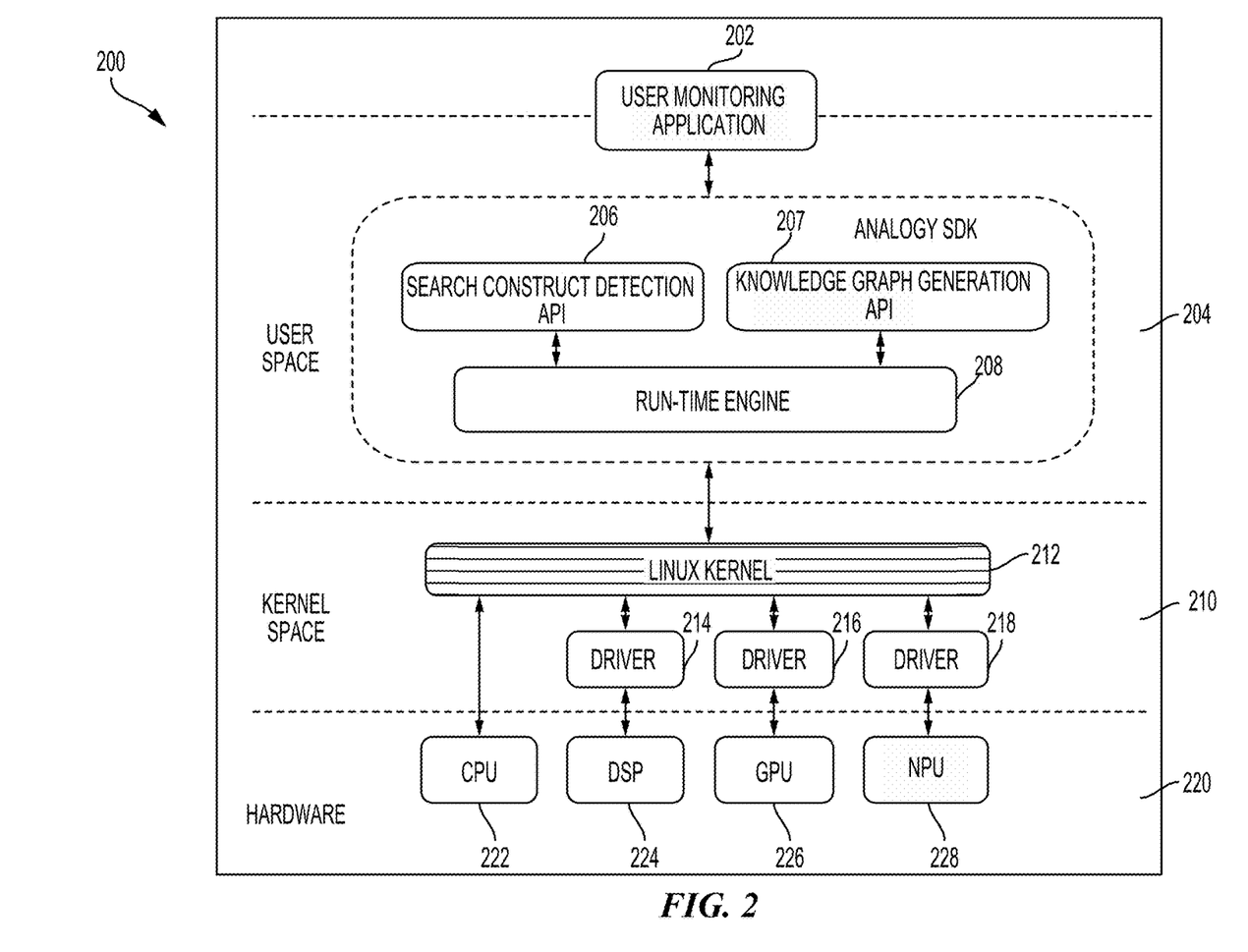
FIG. 2 is a block diagram illustrating an exemplary software architecture that may modularize artificial intelligence (AI) functions for a search construct validation system, according to aspects of the present disclosure.

FIG. 2 is a block diagram illustrating a software architecture 200 that may modularize artificial intelligence (AI) functions for a search construct validation system, according to aspects of the present disclosure. Using the architecture, a user monitoring application 202 may be designed such that it may cause various processing blocks of an SOC 220 (for example a CPU 222, a DSP 224, a GPU 226, and/or an NPU 228) to perform supporting computations during run-time operation of the user monitoring application 202. FIG. 2 describes the software architecture 200 for search construct validation. It should be recognized that the search construct validation system is not limited to Web search results. According to aspects of the present disclosure, the user monitoring and the search construct validation functionality is applicable to any type of user research activity.

The user monitoring application 202 may be configured to call functions defined in a user space 204 that may, for example, provide search construct validation services. The user monitoring application 202 may make a request for compiled program code associated with a library defined in a search construct detection application programming interface (API) 206. The search construct detection API 206 is configured to determine a construct of a search query recognized on a search engine of a third party webpage and a plurality of related constructs represented in a plurality of search results generated based on the search query. In response, compiled program code of a knowledge graph generation API 207 is configured to generate a knowledge graph illustrating a mapping between a determined construct and a plurality of related constructs and a hierarchy and a strength of a relationship between the determined construct and the plurality of related constructs. In addition, the knowledge graph generation API 207 is configured to display, via an interactive user interface, the knowledge graph illustrating the mapping between the determined construct and the plurality of related constructs and the hierarchy and the strength of the relationships.

A run-time engine 208, which may be compiled code of a run-time framework, may be further accessible to the user monitoring application 202. The user monitoring application 202 may cause the run-time engine 208, for example, to take actions for providing a knowledge graph in response to detecting search results presented to a user. In response to detection of the search constructs, the run-time engine 208 may in turn send a signal to an operating system 210, such as a Linux Kernel 212, running on the SOC 220. FIG. 2 illustrates the Linux Kernel 212 as software architecture for search construct validation. It should be recognized, however, that aspects of the present disclosure are not limited to this exemplary software architecture. For example, other kernels may provide the software architecture to support the search construction validation functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

A construct is an idea or theory containing various conceptual elements, which are typically subjective and not based on empirical evidence. A search engine operates in response to constructs in a search query and generates search results including certain constructs represented in the search results. Learning a new topic or engaging in cross-disciplinary collaboration often involves Internet research and analysis of various constructs presented in search results. Unfortunately, established search engines make it difficult to learn a new topic or engage in cross-disciplinary collaboration because constructs are defined and referred to differently across disciplines. This issue is further complicated by the lack of precise definitions for many constructs, leading to further confusion. In particular, these limitations can manifest in difficulties interpreting the answers to questions and making inferences from them, especially in web searches. For example, how does a user know that determined search results actually reflect information about the construct queried.

Aspects of the present disclosure are directed to a system for search construct validation that is provided as an add-on to web search engines. In some aspects of the present disclosure, a search construct validation system improves web searches by producing a knowledge graph illustrating a relationship between the construct in the search query and the constructs represented in the search results. In some aspects of the present disclosure, the knowledge graph is a cognitive ontology graph illustrating a mapping between constructs, including information about a hierarchy (e.g., 'response inhibition' is a component of 'self-control' but 'self-control' is not a component of 'response inhibition') and a strength of the relationship (e.g., 'impulsivity' is more related to 'response inhibition' than to 'self-control'). This cognitive ontology graph allows the user—regardless of level of expertise—to understand the context of the search results and incorporate that understanding into subsequent choices. In some aspects of the present disclosure, the cognitive ontology graph is presented to the user through an interactive interface for manipulating and further analyzing the cognitive ontology graph.

Figure 3:
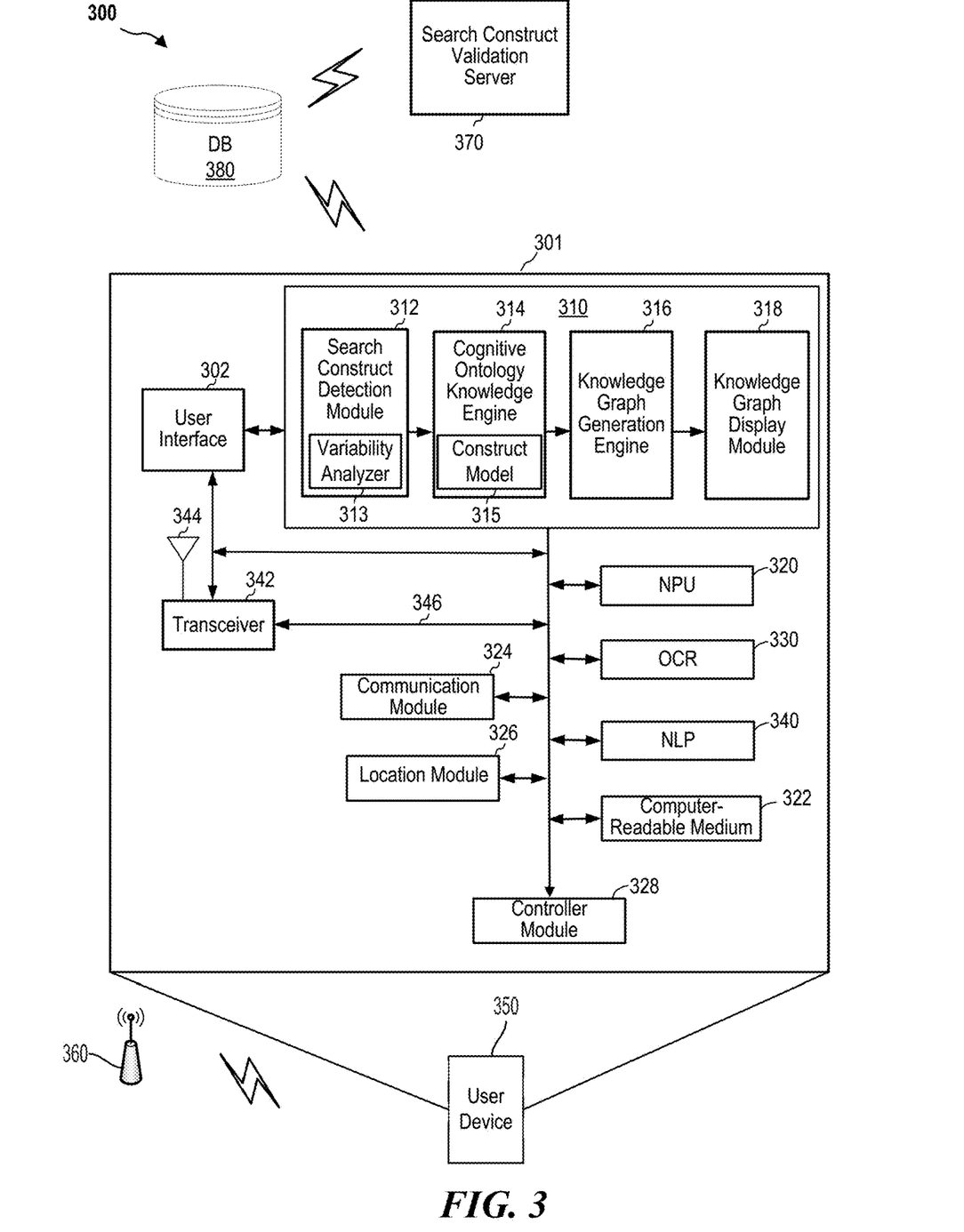
FIG. 3 is a diagram illustrating a hardware implementation for a search construct validation system, according to aspects of the present disclosure.

FIG. 3 is a diagram illustrating a hardware implementation for a search construct validation system 300, according to aspects of the present disclosure. The search construct validation system 300 may be configured to provide a context and improve an understanding of constructs in answers provided by web search results to a user in response to a user search query. The search construct validation system 300 is configured to determine a construct of a search query recognized on a search engine of a third party webpage and a plurality of related constructs represented in a plurality of search results generated based on the search query. The search construct validation system 300 is also configured to map the determined construct to the plurality of related constructs represented in the plurality of search results generated based on the search query. In response, the search construct validation system 300 is further configured to generate a knowledge graph illustrating the mapping between the determined construct and the plurality of related constructs and a hierarchy and a strength of a relationship between the determined construct and the plurality of related constructs. In addition, the search construct validation system 300 is also configured to display, via an interactive user interface, the knowledge graph illustrating the mapping between the determined construct and the plurality of related constructs and the hierarchy and the strength of the relationship between the determined construct and the plurality of related constructs.

The search construct validation system 300 includes a user monitoring system 301 and a search construct validation server 370 in this aspect of the present disclosure. The user monitoring system 301 may be a component of a user device 350. The user device 350 may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a global positioning system device, or any other suitable device that is configured to communicate via a wireless or wired medium.

The search construct validation server 370 may connect to the user device 350 for monitoring web search results presented to the user to determine whether constructs present in the search results and/or the search query involve validation. For example, the search construct validation server 370 may determine a construct of a search query recognized on a search engine of a third party webpage and a plurality of related constructs represented in a plurality of search results generated based on the search query. The search construct validation server 370 may also map the determined construct to the plurality of related constructs represented in the plurality of search results generated based on the search query. The search construct validation server 370 may also generate a knowledge graph illustrating the mapping between the determined construct and the plurality of related constructs and a hierarchy and a strength of a relationship between the determined construct and the plurality of related constructs. The search construct validation server 370 may display, via an interactive user interface, the knowledge graph illustrating the mapping between the determined construct and the plurality of related constructs and the hierarchy and the strength of the relationship between the determined construct and the plurality of related constructs.

The user monitoring system 301 may be implemented with an interconnected architecture, represented generally by an interconnect 346. The interconnect 346 may include any number of point-to-point interconnects, buses, and/or bridges depending on the specific application of the user monitoring system 301 and the overall design constraints. The interconnect 346 links together various circuits including one or more processors and/or hardware modules, represented by a user interface 302, a user activity module 310, a neural network processor (NPU) 320, a computer-readable medium 322, a communication module 324, a location module 326, a controller module 328, an optical character recognition (OCR) 330, and a natural language processor (NLP) 340. The interconnect 346 may also link various other circuits such as timing sources, peripherals, voltage regulators, and power management circuits, which are well known in the art, and therefore, will not be described any further.

The user monitoring system 301 includes a transceiver 342 coupled to the user interface 302, the user activity module 310, the NPU 320, the computer-readable medium 322, the communication module 324, the location module 326, the controller module 328, the OCR 330, and NLP 340. The transceiver 342 is coupled to an antenna 344. The transceiver 342 communicates with various other devices over a transmission medium. For example, the transceiver 342 may receive commands via transmissions from a user. In this example, the transceiver 342 may receive/transmit information for the user activity module 310 to/from connected devices within the vicinity of the user device 350.

The user monitoring system 301 includes the NPU 320, the OCR 330, and the NLP 340 coupled to the computer-readable medium 322. The NPU 320, the OCR 330, and NLP 340 performs processing, including the execution of software stored on the computer-readable medium 322 to provide a neural network model for user monitoring and search construct validation functionality according to the present disclosure. The software, when executed by the NPU 320, the OCR 330 and the NLP 340, causes the user monitoring system 301 to perform the various functions described for presenting a knowledge graph to clarify search constructs presented to the user through the user device 350, or any of the modules (e.g., 310, 324, 326, 330, and/or 340). The computer-readable medium 322 may also be used for storing data that is manipulated by the OCR 330 and the NLP 340 when executing the software to analyze user communications.

The location module 326 may determine a location of the user device 350. For example, the location module 326 may use a global positioning system (GPS) to determine the location of the user device 350. The location module 326 may implement a dedicated short-range communication (DSRC)-compliant GPS unit. A DSRC-compliant GPS unit includes hardware and software to make the autonomous vehicle 350 and/or the location module 326 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the user device 350 that are not modules of the user monitoring system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The user monitoring system 301 also includes the OCR 330 and the NLP 340 to automatically detect search constructs (e.g., constructs presented in search results provided to a user and/or constructs in a user search) to enable clarification of search constructs. The user monitoring system 301 may follow a process to detect and determine whether search constructs are presented to the user. When the user monitoring system 301 has access to a document object model (DOM) (e.g., on a webpage or embedded in an application), the user monitoring system 301 may detect search constructs. When no object model is available, the user monitoring system 301 may use the OCR 330 and the NLP 340 to automatically detect search constructs.

The user activity module 310 may be in communication with the user interface 302, the NPU 320, the computer-readable medium 322, the communication module 324, the location module 326, the controller module 328, the OCR 330, the NLP 340, and the transceiver 342. In one configuration, the user activity module 310 monitors communications from the user interface 302. The user interface 302 may monitor user communications to and from the communication module 324. According to aspects of the present disclosure, the OCR 330 and the NLP 340 automatically detect search constructs and may use computer vision techniques to automatically detect the search constructs.

As shown in FIG. 3, the user activity module 310 includes a search construct detection module 312, a variability analyzer 313, a cognitive ontology knowledge engine 314, a construct model 315, a knowledge graph generation engine 316, and a knowledge graph display module 318. The search construct detection module 312, the variability analyzer 313, the cognitive ontology knowledge engine 314, the construct model 315, the knowledge graph generation engine 316, and the knowledge graph display module 318 may be components of a same or different artificial neural network, such as a deep convolutional neural network (CNN). The construct model 315 is not limited to a CNN. The user activity module 310 monitors and analyzes search constructs received from the user interface 302.

This configuration of the user activity module 310 includes the search construct detection module 312 configured to determine a construct of a search query recognized on a search engine of a third party webpage and a plurality of related constructs represented in a plurality of search results generated based on the search query. In some aspects of the present disclosure, the search construct detection module 312 uses the OCR 330 and the NLP 340 to analyze search results viewed by the user in response to search queries submitted by the user. For example, the search construct detection module 312 scans the viewed text for a combination of constructs and/or words representing answers from web search results.

In some aspects of the present disclosure, components of the user activity module 310 are implemented as a browser plugin that monitors the query and the set of web search results. In this plugin configuration, the user activity module provides a notification to the user when the search results are analyzed and an interactive interface, such as the user interface 302, is ready for operation. In this plugin configuration, the search construct detection module 312, the variability analyzer 313, the cognitive ontology knowledge engine 314, and the construct model 315 may be implemented within this browser plugin or be run in a local application or on the search construct validation server 370.

In some aspects of the present disclosure, the search construct detection module 312 includes the variability analyzer 313 configured to analyze the top-level textual features of the search results, algorithmically determining the level of similarity between the results. In some aspects of the present disclosure, the variability analyzer 313 outputs an estimate of the likelihood that the search query is identifying a clearly defined construct. This output estimate is reported to the user by the interactive interface, such as, for example, the user interface 302.

In some aspects of the present disclosure, the variability analyzer identifies the context in which the constructs appear in the search results viewed by the user in response to the user search query construct(s). Depending on the context, the construct can have very different meanings with different implications for user understanding and decision because constructs are defined and referred to differently across disciplines. Further complicating this issue is that many constructs are not precisely defined, leading to confusion. This can manifest in difficulties interpreting the answers to questions and making inferences from them, especially in web searches.

In these aspects of the present disclosure, the variability analyzer 313 uses a tuned natural language processing algorithm (e.g., using the NLP 340) to determine the topic and sentiment of the article and the context where the search constructs appear. The variability analyzer 313 may be implemented using a tuned natural language processing algorithm, such as a construct modeling approach and/or sentiment analysis. The variability analyzer 313 may also recognize whether a given search construct is related to other search constructs within the search results viewed by the user. In particular, the variability analyzer 313 may establish a frame of reference for the search constructs according to a textual context and the relevance of the search constructs detected within the search results viewed by the user.

In addition, the user activity module 310 includes the cognitive ontology knowledge engine 314 configured to analyze the search results to identify the core constructs represented. In some aspects of the present disclosure, the cognitive ontology knowledge engine 314 uses a construct model trained to identify a relationship between constructs (e.g, a 'cognitive ontology'). Identifying the relationship between constructs enables generating of a knowledge graph that quantifies the conceptual relationship among the search query construct(s) and the web search results.

In these aspects of the present disclosure, the user activity module 310 includes the knowledge graph generation engine 316 configured to map the determined construct to a plurality of related constructs represented in a plurality of search results generated based on a user search query. In some aspects of the present disclosure, the knowledge graph generation engine 316 is also configured to generate a knowledge graph illustrating the mapping between the determined construct and the plurality of related constructs and a hierarchy and a strength of a relationship between the determined construct and the plurality of related constructs.

In addition, the user activity module 310 includes the knowledge graph display module 318 to display, via an interactive user interface, the knowledge graph illustrating the mapping between the determined construct and the plurality of related constructs and the hierarchy and the strength of the relationship between the determined construct and the plurality of related constructs. In some configurations, the knowledge graph display module 318 displays the output of the variability analyzer 313 and the cognitive ontology knowledge engine 314 to the user. A search construct detection module, a cognitive ontology knowledge engine, a knowledge graph generation engine, a knowledge graph display module, a variability analyser and a construct model are software modules or software programming.

In some aspects of the present disclosure, the user activity module 310 may be implemented and/or work in conjunction with the search construct validation server 370. In one configuration, a database (DB) 380 stores data related to each of these logic modules and the display unit may output, as the user interface 302, a knowledge graph to assist the user in understanding the search constructs represented in the search results viewed by a user. In some aspects of the present disclosure, the search construct validation system 300 may include a web browser plugin. In other aspects of the present disclosure, the search construct validation server 370 provides an offline application that scans search results viewed by the user. In other aspects of the present disclosure, the search construct validation system 300 may include a mobile application that scans search results displayed on the user interface 302 to display a knowledge graph to assist the user in understanding search construct in a viewed document, for example, as shown in FIG. 4.

Figure 4:
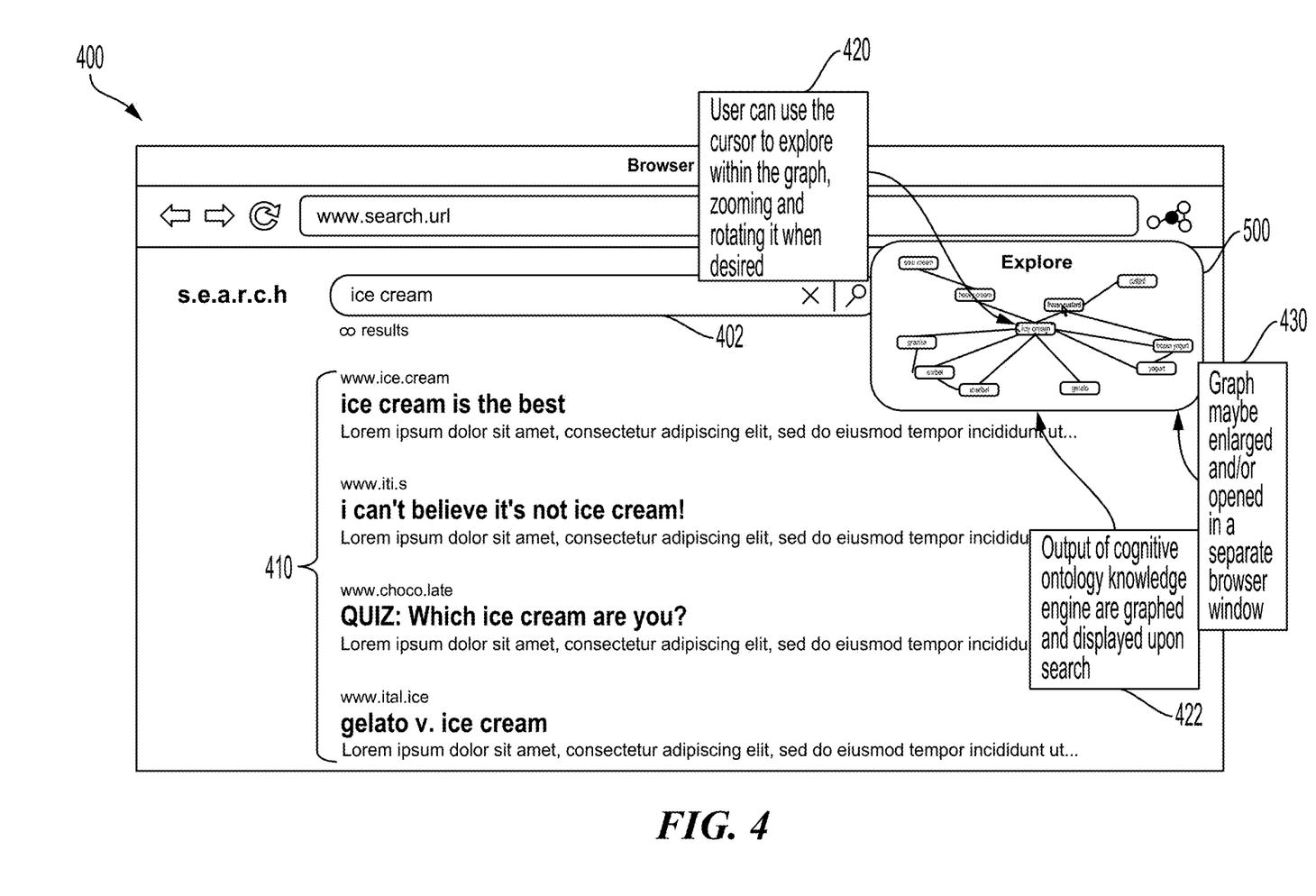
FIG. 4 is a display screen illustrating a search construct validation system process, in accordance with aspects of the present disclosure.

FIG. 4 is a display screen illustrating a web search results page including a knowledge graph, in accordance with aspects of the present disclosure. In some aspects of the present disclosure, a web search results page 400 includes a knowledge graph 500, as further illustrated in FIG. 5. For example, a user performs a web search by entering a user search query in a search query field 402 of the web search results page 400. In this example, the user enters 'ice cream' as a search construct and is provided with web search results 410. In this aspect of the present disclosure, a knowledge graph 500 is generated and provided as an interactive display for the user. For example, at block 420, the user can use a cursor to explore within the knowledge graph 500, zooming and rotating the knowledge graph 500 when desired.

In this example, at block 422, an output of the cognitive ontology knowledge engine 314 is graphed by the knowledge graph generation engine 316 and displayed by the knowledge graph display module 318 upon search. In aspects of the present disclosure, the modules of the user activity module 310 work together during web searches to produce an interactive graph, such as the knowledge graph 500, showing the relationship between the construct in the search query and the constructs represented in the results. The knowledge graph 500 illustrates the mapping between constructs, including information about hierarchy and strength of relationship. This additional information allows the user, regardless of level of expertise, to understand the context of the search results and incorporate that understanding into subsequent choices. At block 430, the knowledge graph 500 may be enlarged and/or opened in a separate browser window, for example, as further illustrated in FIG. 5.

Figure 5:
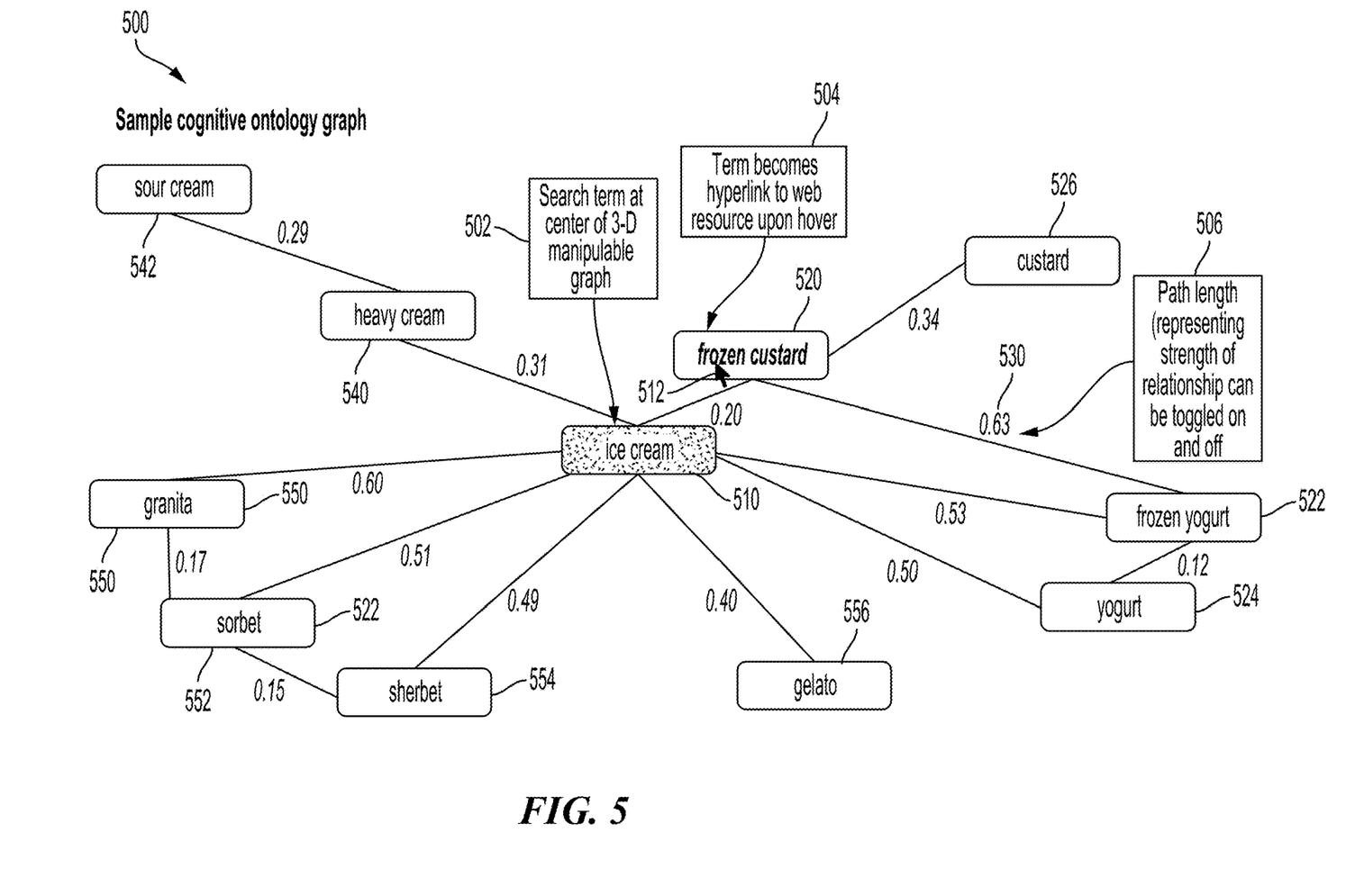
FIG. 5 is a display screen illustrating a search construct validation system process, in accordance with aspects of the present disclosure.

FIG. 5 is a display screen further illustrating the knowledge graph 500 of FIG. 4, in accordance with aspects of the present disclosure. In some aspects of the present disclosure, a search construct validation process is applied to the web search results page 400 of FIG. 4 to automatically generate the knowledge graph 500. In this example, the search construct 510 ('ice cream') is placed at a center of the knowledge graph 500, which is shown in a 3D configuration, as noted at block 502. At block 504, a result construct 520 ('frozen custard') transitions to a hyperlink to a web resource upon hovering over the result construct 520 with a user mouse 512. At block 506, a path length 530, representing a strength (e.g., 0.63) of a relationship between result construct 520 ('frozen custard') and a result construct 522 ('frozen yogurt'), as well as a result construct 524 ('yogurt') and a result construct 526 ('custard'). Other result constructs include heavy cream 540, sour cream 542, granita 550, sorbet 552, sherbet 554, and gelato 556, along with their associated path lengths.

As shown in FIG. 5, each of the result constructs also includes a hyperlink to a source (e.g., Wikipedia) that provides additional, widely-accepted information about the associated concept. This hyperlink feature may be toggled on and off. In addition, each result construct may also be listed with hyperlinks to the specific part of the search results pages that mention the result construct. In some aspects of the present disclosure, the user is able to zoom in and out of the visualization of the knowledge graph 500 as well as manipulate the knowledge graph 500 in three planes. The interface provided by the knowledge graph 500 also provides a toggle feature that shows or hides the numerical weights between the constructs on the knowledge graph 500. These features allow the user to explore the knowledge graph 500 and learn more about each related construct and the nature of the relationships between constructs. A search construct validation system may engage in a process, for example, as shown in FIG. 6.

Figure 6:
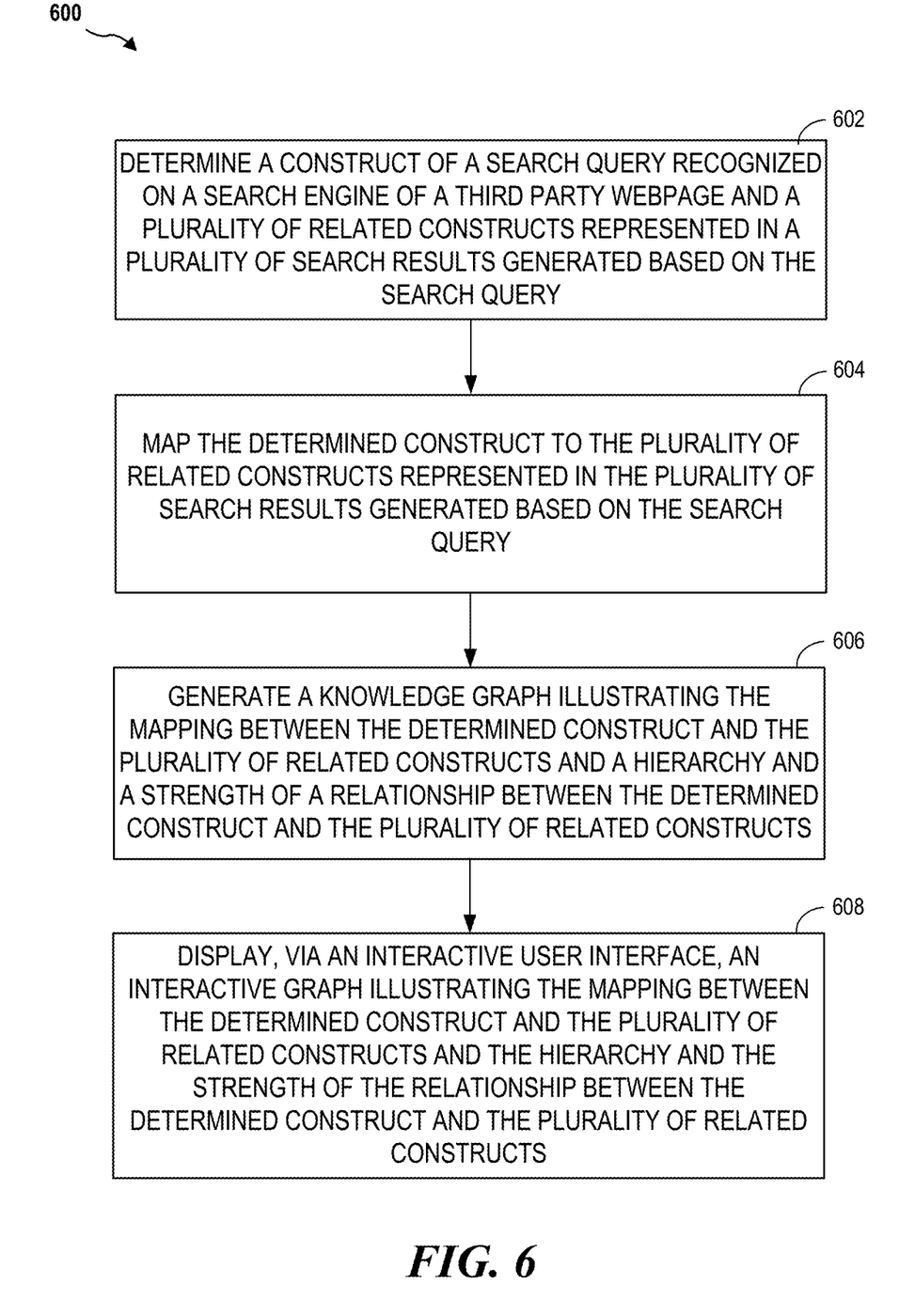
FIG. 6 is a flowchart illustrating a method for search construct validation, according to aspects of the present disclosure.

FIG. 6 is a flowchart illustrating a method for search construction validation, according to aspects of the present disclosure. A method 600 of FIG. 6 begins at block 602, in which a construct of a search query recognized on a search engine of a third party webpage and a plurality of related constructs represented in a plurality of search results generated based on the search query are determined. For example, as described in FIG. 4, a search construct process is applied to a web search results page 400 viewed by a user to automatically detect search constructs. In this example, a user performs a web search by entering a user search query in a search query field 402 of the web search results page 400. In this example, the user enters 'ice cream' as a search construct and is provided with web search results 410.

Referring again to FIG. 6, at block 604, the determined construct is mapped to the plurality of related constructs represented in the plurality of search results generated based on the search query. For example, as shown in FIG. 3, the cognitive ontology knowledge engine 314 uses a construct model trained to identify a relationship between constructs (e.g, a 'cognitive ontology'). Identifying the relationship between constructs enables generating of a knowledge graph that quantifies the conceptual relationship among the search query construct(s) and the web search results. In this example, the user activity module 310 includes the knowledge graph generation engine 316 configured to map the determined construct to a plurality of related constructs represented in a plurality of search results generated based on a user search query.

At block 606, a knowledge graph is generated illustrating the mapping between the determined construct and the plurality of related constructs and a hierarchy and a strength of a relationship between the determined construct and the plurality of related constructs. For example, as shown in FIG. 3, the knowledge graph generation engine 316 is also configured to generate a knowledge graph illustrating the mapping between the determined construct and the plurality of related constructs and a hierarchy and a strength of a relationship between the determined construct and the plurality of related constructs. As shown in FIG. 4, a knowledge graph 500 is generated and provided as an interactive display for the user. For example, at block 420, the user can use a cursor to explore within the knowledge graph 500, zooming and rotating the knowledge graph 500 when desired.

Referring again to FIG. 6, at block 608, the interactive graph is displayed via an interactive user interface illustrating the mapping between the determined construct and the plurality of related constructs and the hierarchy and the strength of the relationship between the determined construct and the plurality of related constructs. For example, as shown in FIG. 4, at block 422, an output of the cognitive ontology knowledge engine 314 is graphed by the knowledge graph generation engine 316 and displayed by the knowledge graph display module 318 upon search. In aspects of the present disclosure, the modules of the user activity module 310 work together during web searches to produce an interactive graph, such as the knowledge graph 500, showing the relationship between the construct in the search query and the constructs represented in the results. The knowledge graph 500 illustrates the mapping between constructs, including information about hierarchy and strength of relationship, which allows the user, regardless of level of expertise, to understand the context of the search results and incorporate that understanding into subsequent choices, as further illustrated in FIG. 5.

The method 600 may also include analyzing top-level textual features of the search results. The method 600 may further include algorithmically determining a level of similarity between the results. The method 600 may also include outputting an estimate of a likelihood that the search query is identifying a clearly defined construct.

Aspects of the present disclosure are directed to a system for search construct validation that is provided as an add-on to web search engines. In some aspects of the present disclosure, a search construct validation system improves web searches by producing a knowledge graph illustrating a relationship between the construct in the search query and the constructs represented in the search results. In some aspects of the present disclosure, the knowledge graph is a cognitive ontology graph illustrating a mapping between constructs, including information about a hierarchy (e.g., 'response inhibition' is a component of 'self-control' but 'self-control' is not a component of 'response inhibition') and a strength of the relationship (e.g., 'impulsivity' is more related to 'response inhibition' than to 'self-control'). This cognitive ontology graph allows the user—regardless of level of expertise—to understand the context of the search results and incorporate that understanding into subsequent choices.

In some aspects of the present disclosure, the cognitive ontology graph is presented to the user through an interactive interface for manipulating and further analyzing the cognitive ontology graph. In these aspects of the present disclosure, an interactive graph shows a relationship between the construct in the search query and the constructs in the search results and graphically illustrates the mapping between constructs, including information about hierarchy and strength of relationship.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for search construct validation, comprising:
   determining a construct of a search query recognized on a search engine of a third party webpage and a plurality of related constructs represented in a plurality of search results generated based on the search query;
   mapping the determined construct to the plurality of related constructs represented in the plurality of search results generated based on the search query;
   generating a knowledge graph illustrating the mapping between the determined construct and the plurality of related constructs and a hierarchy and a strength of a conceptual relationship between the determined construct and the plurality of related constructs;
   displaying, via an interactive user interface, an interactive graph illustrating the mapping between the determined construct and the plurality of related constructs and the hierarchy and the strength of the conceptual relationship between the determined construct and the plurality of related constructs;
   detecting a user mouse hovering over a result construct within the knowledge graph viewed by a user;
   converting the result construct into a clickable hyperlink to redirect the user to a web resource; and
   redirecting the user to the web resource in response to clicking the clickable hyperlink with the user mouse.

2. The method of claim 1, in which determining further comprises:
   detecting the search query on the search engine of the third party webpage;
   determining the construct of the search query, and
   determining the plurality of related constructs represented in the plurality of search results based on the search query.

3. The method of claim 1, in which determining further comprises:
   monitoring the search query and the plurality of search results generated based on the search query; and
   notifying a user when an analysis of the search results is completed and the interactive interface is operational.

4. The method of claim 1, in which the mapping comprises:
   analyzing top-level textual features of the search results;
   algorithmically determining a level of similarity between the results; and
   outputting an estimate of a likelihood that the search query is identifying a clearly defined construct.

5. The method of claim 4, in which outputting the estimate comprises reporting an output to a user through the interactive user interface.

6. The method of claim 1, in which generating comprises:
   analyzing the plurality of search results to identify core constructs represented in the plurality of search results;
   modeling the conceptual relationship between the core constructs represented in the plurality of search results; and quantifying the conceptual relationship among the construct of the search query and the core constructs represented in the plurality of search results.

7. The method of claim 6, further comprising generating a cognitive ontology graph that quantifies the conceptual relationship among the construct of the search query and the core constructs of the plurality of search results.

8. A non-transitory computer-readable medium having program code recorded thereon for search construct validation, the program code being executed by a processor and comprising:

program code to determine a construct of a search query recognized on a search engine of a third party webpage and a plurality of related constructs represented in a plurality of search results generated based on the search query;
 program code to map the determined construct to the plurality of related constructs represented in the plurality of search results generated based on the search query;
 program code to generate a knowledge graph illustrating a mapping between the determined construct and the plurality of related constructs and a hierarchy and a strength of a conceptual relationship between the determined construct and the plurality of related constructs;
 program code to display, via an interactive user interface, an interactive graph illustrating the mapping between the determined construct and the plurality of related constructs and the hierarchy and the strength of the conceptual relationship between the determined construct and the plurality of related constructs;
 program code to detect a user mouse hovering over a result construct within the knowledge graph viewed by a user;
 program code to convert the result construct into a clickable hyperlink to redirect the user to a web resource; and
 program code to redirect the user to the web resource in response to clicking the clickable hyperlink with the user mouse.

9. The non-transitory computer-readable medium of claim 8, in which the program code to determine further comprises:
 detecting the search query on the search engine of the third party webpage;
 determining the construct of the search query; and
 determining the plurality of related constructs represented in the plurality of search results based on the search query.

10. The non-transitory computer-readable medium of claim 8, in which the program code to determine further comprises:
 program code to monitor the search query and the plurality of search results generated based on the search query; and
 program code to notify a user when an analysis of the search results is completed and the interactive interface is operational.

11. The non-transitory computer-readable medium of claim 8, in which the program code to map comprises:
 program code to analyze top-level textual features of the search results;
 program code to algorithmically determine a level of similarity between the results; and
 program code to output an estimate of a likelihood that the search query is identifying a clearly defined construct.

12. The non-transitory computer-readable medium of claim 11, in which the program code to output the estimate comprises program code to report an output to a user through the interactive user interface.

13. The non-transitory computer-readable medium of claim 8, in which the program code to generate comprises:
 program code to analyze the plurality of search results to identify core constructs represented in the plurality of search results;
 program code to model the conceptual relationship between the core constructs represented in the plurality of search results; and
 program code to quantify the conceptual relationship among the construct of the search query and the core constructs represented in the plurality of search results.

14. The non-transitory computer-readable medium of claim 13, further comprising program code to generate a cognitive ontology graph that quantifies the conceptual relationship among the construct of the search query and the core constructs of the plurality of search results.

15. A system for search construct validation, the system comprising:
 a search construct detection module to determine a construct of a search query recognized on a search engine of a third party webpage and a plurality of related constructs represented in a plurality of search results generated based on the search query;
 a cognitive ontology knowledge engine to map the determined construct to the plurality of related constructs represented in the plurality of search results generated based on the search query;
 a knowledge graph generation engine to generate a knowledge graph illustrating a mapping between the determined construct and the plurality of related constructs and a hierarchy and a strength of a conceptual relationship between the determined construct and the plurality of related constructs; and
 a knowledge graph display module to display, via an interactive user interface, an interactive graph illustrating the mapping between the determined construct and the plurality of related constructs and the hierarchy and the strength of the conceptual relationship between the determined construct and the plurality of related constructs, in which the interactive user interface is to detect a user mouse hovering over a result construct within the knowledge graph viewed by a user, to convert the result construct into a clickable hyperlink to redirect the user to a web resource, and to redirect the user to the web resource in response to clicking the clickable hyperlink with the user mouse.

16. The system of claim 15, in which the search construct detection module comprises a variability analyser to analyze top-level textual features of the search results, to algorithmically determine a level of similarity between the results, and to output an estimate of a likelihood that the search query is identifying a clearly defined construct.

17. The system of claim 16, in which the variability analyser is further to report an output to a user through the interactive user interface.

18. The system of claim 15, in which the cognitive ontology knowledge engine comprises a construct model to model the conceptual relationship between core constructs represented in the plurality of search results, and to quantify the conceptual relationship among the construct of the search query and the core constructs represented in the plurality of search results.

* * * * *